United States Patent [19]

Hergenrother et al.

[11] 4,242,491
[45] Dec. 30, 1980

[54] POLYPHOSPHAZENE POLYMERS CONTAINING SUBSTITUENTS OF ACRYLATE FUNCTIONALITY

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,102

[22] Filed: Sep. 8, 1978

[51] Int. Cl.$^3$ .............................................. C08G 83/00
[52] U.S. Cl. ................................... 528/168; 528/332; 528/361; 528/399
[58] Field of Search ................ 528/399, 168, 361, 332

[56] References Cited

U.S. PATENT DOCUMENTS

| | | | |
|---|---|---|---|
| 3,711,389 | 1/1973 | Hook et al. | 204/159.12 |
| 3,804,927 | 4/1974 | Lawson et al. | 260/977 |
| 3,945,966 | 3/1976 | Vicic et al. | 260/42.15 |
| 4,040,843 | 8/1977 | Franco-Filipasic | 106/15 FP |

Primary Examiner—Wilbert J. Briggs, Sr.

[57] ABSTRACT

Polyphosphazene polymers are prepared which contain repeating units represented by the formulas:

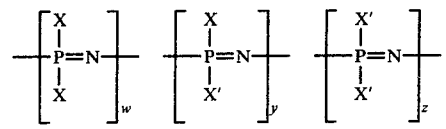

wherein X and X' are the same or different and are represented by:

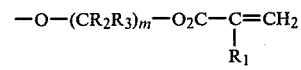

wherein $R_1$ is selected from the group consisting of hydrogen and a methyl group; $R_2$ and $R_3$ are independently selected for each carbon atom from a group consisting of hydrogen and alkyl radical containing from 1 to 6 carbon atoms; $2 \leq m \leq 20$; X' can additionally be selected from the group consisting of substituted and unsubstituted alkoxy, aryloxy, amino and mercapto radicals, and mixtures thereof, which are compatible with an alkoxy acrylate substituent and are known in the state of the art of polyphosphazene technology; and $20 \leq (w+y+z) \leq 50,000$ per polymer.

The polymers of the invention can be utilized to form protective films and can also be utilized in applications such as for molding, coatings, foams and the like.

16 Claims, No Drawings

POLYPHOSPHAZENE POLYMERS CONTAINING SUBSTITUENTS OF ACRYLATE FUNCTIONALITY

BACKGROUND OF THE INVENTION

Polyphosphazene polymers containing repeating

units in which various alkoxy, substituted alkoxy, aryloxy, substituted aryloxy, amino and mercapto groups are attached to the phosphorus atom and their method of preparation are described in the prior art as illustrated in the publication "Nitrogen-Phosphorus Compounds", Academic Press, New York, N.Y., 1972 by H. R. Allcock and "Poly(Organophosphazenes)", Chemtech, Sept. 19, 1975, by H. R. Allcock and in such U.S. Pat. Nos. as 3,515,688; 3,702,833; 3,856,712; 3,974,242; and 4,042,561 the disclosures of which are herein incorporated by reference.

However, none of the aforementioned publications and patents or for that matter, none of the prior art of which applicants are aware, discloses or suggest polyphosphazene homopolymers or copolymers containing acrylate ester substituents attached to the phosphorus atom via an oxy linkage or methods of preparing such polymers.

SUMMARY OF THE INVENTION

This invention relates to polyphosphazene homopolymers and copolymers containing repeating

units in the polymer chain in which alkoxy acrylate ester substituents are attached to the phosphorus atom via an oxy linkage and are hereinafter referred to as acrylate ester substituents. More particularly, the invention relates to polyphosphazene polymers having substituents derived from a hydroxyalkyl acrylate ester which is attached to the phosphorus atom and to a method of preparing such polymers. Optionally, any alkoxy, aryloxy, amino or mercapto substituent groups, or mixtures thereof which are compatible with the acrylate ester substituents and are known in the polyphosphazene state of the art can be substituted onto the polyphosphazene in addition to the alkoxy acrylate ester substituents. These optional substituents can be substituted onto the polyphosphazene by the method disclosed hereinafter or by prior art methods.

More specifically, the polymers of the polymer invention comprise repeating units represented by the formulas:

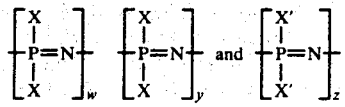

wherein X and X' are the same or different and are represented by:

$$-O-(CR_2R_3)_m-O_2C-\underset{\underset{R_1}{|}}{C}=CH_2$$

wherein $R_1$ is selected from the group consisting of hydrogen and methyl; $R_2$ and $R_3$ are independently selected for each carbon atoms from a group consisting of hydrogen and alkyl radicals containing from 1 to 6 carbon atoms; and $2 \leq m \leq 20$; and X' can be additionally selected from the group consisting of substituted and unsubstituted alkoxy, aryloxy, amino and mercapto radicals or mixtures thereof, which are compatible with alkoxy acrylate ester substituents. The polymer can contain from 20 to 50,000 of such units such that $20 \leq (w+y+z) \leq 50,000$.

The substitution of an alkoxy acrylate ester radical on the base poly(phosphazene) polymer enables this derivative to be cured through the unsaturation in the acrylate functionality.

In the polymer units represented by the above formulas, all X substituent groups can be the same or they can be mixed and all X' substituent groups can be the same or mixed. In the mixtures, the X substituent groups can be mixtures of different alkoxy acrylate ester groups and the X' substituent groups can be mixtures of alkoxy, aryloxy, amino and mercapto groups. All substituents are randomly distributed on the polymer chain.

DETAILED DESCRIPTION OF THE INVENTION

The phosphazene polymers of the invention can be represented by the formula:

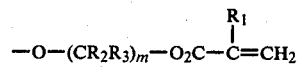

wherein n is from 20 to 50,000 and a+b=2 and a and b are greater than zero. The percentage of X in (X+X'), when X' represents a substituent other than an alkoxy acrylate ester substituent, must be at least 0.1 mole percent and preferably at least 0.5 mole percent to receive the benefit of the acrylate ester substituent with respect to molding, foaming, and coating applications. It is preferred to use a maximum of 50.0 mole percent of the alkoxy acrylate ester substituent, however, it is possible to prepare useful polymers containing 100 percent of alkoxy acrylate substitution.

The polymers of the invention are additionally useful since the alkoxy acrylate ester group can be reacted with reactive compounds to convert the polymer into a derivative polymer. At least some such derivative polymers cannot be prepared directly.

The alkoxy acrylate ester substituted polymers of the invention display a significant amount of solvent resistance.

The polymers of the invention can be used to prepare protective films and can be utilized in applications such as molding, foaming, coatings, and the like.

When the term polymer is used in the specification it will include within its meaning both homopolymers and copolymers containing a polyphosphazene backbone.

METHODS OF POLYMER PREPARATION

The polymers of the present invention are prepared by reacting a poly(dichlorophosphazene) having the formula $-(NPCl_2)_n-$, in which n is from 20 to 50,000, in the presence of a tertiary amine, with either one or more hydroxyalkyl acrylate esters, or a mixture of hydroxylalkyl acrylate ester with any substituted or unsubstituted alkanol, aryl alcohol, amine or mercaptan, or mixtures thereof which is reactive with the poly(dichlorophosphazene) to form a substitution group on a phosphorus atom in the poly(dichlorophosphazene) which is known in the state of the art and is compatible with the acrylate substituent. Examples of such compounds are discussed in the section entitled "Additional Reactive Compounds" below.

I. THE POLY(DICHLOROPHOSPHAZENE) POLYMER

The poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NPCl$_2$)$_n$—, in which n can range from 20 to 50,000 or more. As described in the aforementioned references, the polymers are in general prepared by the thermal polymerization of cyclic oligomers having the formula (NPCl$_2$)$_g$, in which q is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about 10$^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. THE HYDROXYALKYL ACRYLATE ESTERS USED TO PREPARE THE POLYMERS OF THE INVENTION

The hydroxyalkyl acrylate esters which are used to prepare the polymers of the invention to form alkoxy acrylate substituents are represented by the following structural formula:

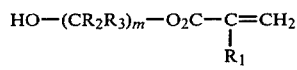

wherein R$_1$ is selected from the group consisting of hydrogen and a methyl group; R$_2$ and R$_3$ are independently selected for each carbon atom from a group consisting of hydrogen and alkyl radical containing from 1 to 6 carbon atoms; and 2≦m≦20.

The R$_2$ and R$_3$ substituents are independently selected for each carbon atom such that the (CR$_2$R$_3$)$_m$ radical can represent a radical such as 3-methylhexyl, where R$_2$ represents a methyl radical on one carbon atom and represents a hydrogen on the remaining five carbons in the hexyl group while R$_3$ represents hydrogen on all carbon atoms. R$_2$ and R$_3$ may represent alkyl radicals such as tert-butyl, sec-butyl and isopropyl radicals, however, it is preferred that R$_2$ and R$_3$ represent either a straight chain alkyl radical or hydrogen.

The monohydroxy alkyl acrylate esters which can be employed in producing the polymers of the present invention include both hydroxylalkyl acrylate esters and hydroxyalkyl methacrylate esters. The hydroxylalkyl radical must contain at least two carbon atoms. Illustrative examples of these compounds include: 2-hydroxyethyl methacrylate; 2-hydroxyethyl acrylate; 2-hydroxypropyl methacrylate; 3-hydroxypropyl acrylate; 2-hydroxypropyl acrylate; 4-hydroxybutyl methacrylate; 2-hydroxybutyl methacrylate; 3-hydroxybutyl methacrylate; 4-hydroxybutyl acrylate; 3-hydroxybutyl acrylate; 2-hydroxybutyl acrylate; 5-hydroxypentyl methacrylate; 6-hydroxyhexyl methacrylate; 6-hydroxy-3-methylhexyl methacrylate; 6-hydrohexyl acrylate; 5-hydroxyhexyl methacrylate; 5-hydroxyhexyl acrylate; 3-hydroxy-2-t-butylpropyl methacrylate; 3-hydroxy-2,2-dimethylpropyl acrylate; 3-hydroxy-2,2-dimethylpropyl methacrylate; 3-hydroxy-2-methyl-2-ethylpropyl methacrylate; 12-hydroxydodecyl methacrylate, 14-hydroxytetradecyl acrylate, 16-hydroxyhexadecyl methacrylate; 18-hydroxyoctadecyl acrylate and the like.

The preferred compound for use in preparing the polymers of the invention is 2-hydroxyethyl methacrylate.

III. ADDITIONAL REACTIVE COMPOUNDS

As indicated heretofore, the polyphosphazene copolymers of the invention, in addition to the alkoxy acrylate substituent group, can contain substituted or unsubstituted alkoxy, aryloxy, amino or mercapto groups.

Preferred copolymer substituents include the following:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula Z(CF$_2$)$_n$CH$_2$OH in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols can be employed.

Aryloxy groups (substituted or unsubstituted) derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols and the like; and alkoxy-substituted phenols such as 4-methoxyphenol, 4-(n-butoxy) phenol and the like. Mixtures of the foregoing aromatic alcohols can also be employed.

Amino groups derived from any of the amino compounds heretofore employed in the polyphosphazene polymer art. Thus, the amino groups may be derived from aliphatic primary and secondary amines such as methylamine, ethylamine, dimethylamine, methylethylamine and the like and aromatic amines such as those described in U.S. Pat. No. 4,042,561, as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al. may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

IV. THE TERTIARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

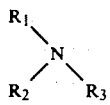

wherein $R_1$, $R_2$ and $R_3$ are alkyl containing from 1 to 8 carbon atoms. Thus, for example, the tertiary amine can be a trialkyl amine such as trimethylamine, triethylamine, triisopropylamine, tri-n-propylamine, tri-isobutylamine, tri-n-butylamine and the like. In addition, tertiary amines such as pyridine and those containing diamine groups such as N,N,N', N'-tetramethylethylene diamine; pyridine; N-methyl morpholine; N-methylpyrrole; 1,4-diaza-bicyclo [2.2.2] octane (DABCO) and dipiperidyl ethane.

V. PROCESS CONDITIONS

As indicated above, the polymers of the present invention are prepared by reacting the poly(dichlorophosphazene) polymer and the hydroxyalkyl acrylate or mixtures of such acrylates in the presence of a tertiary amine. Optionally, compounds listed in the group of "Additional Reactive Compounds" which may be substituted onto the poly(dichlorophosphazene) in the presence of a tertiary amine can be employed in the reaction mix.

The specific reaction conditions and the proportion of ingredients employed in preparing these polymers can vary somewhat depending on factors such as reactivity of the specific hydroxyalkyl acrylate ester utilized, the particular tertiary amine employed, and the degree of substitution desired in the final polymer. In general, reaction temperatures can range from about 25° C. to about 200° C. and times can range from 3 hours up to 7 days; with lower temperatures necessitating longer reaction times and higher temperatures allowing shorter reaction times. These conditions are, of course, utilized in order to obtain the most complete reaction possible, i.e. in order to insure the complete conversion of the chlorine atoms in the polymer to the corresponding ester of the hydroxyalkyl acrylate ester.

The above reaction is ordinarily carried out in the presence of a solvent. The solvent employed in the reaction should be a solvent for the poly(dichlorophosphazene) polymer, the hydroxyalkyl acrylate ester and the tertiary amine. In addition, the materials in the reaction zone should be reasonably free of water. The avoidance of substantial amounts of water in the reaction system is necessary in order to inhibit the premature, undesired reaction of the available chlorine atoms in the chloropolymer. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture can be employed.

In general, the amount of the hydroxyalkyl acrylate ester reacted with the polychlorophosphazene polymer should be at least molecularly equivalent to the number of available chlorine atoms in the polymer being reacted. However, it is preferred that an excess of the hydroxyalkyl acrylate ester be employed, in order to insure complete reaction of all the available chlorine atoms.

While the acrylate ester substituted poly(phosphazene) copolymers of the present invention are prepared in the above-identified manner, that is, in the presence of a tertiary amine, alternative methods of preparation are available for polymers containing substituents other than the acrylate ester substituents. The prior art methods of poly(dichlorophosphazene) substitution such as by reaction with sodium alkoxide as demonstrated in U.S. Pat. No. 3,370,020 to Allcock et al may be used to add the substituents derived from the compounds listed in the list of additional reactive compounds. The poly(dichlorophosphazene) can be initially partially substituted with non-acrylate substituents through the use of these prior art techniques, the remaining chlorines on the partially substituted poly(dichlorophosphazene) can then be replaced with acrylate ester groups using the tertiary amine substitution process. The preparation of the sodium alkoxide of the hydroxy acrylate or methacrylate would cause the anionic polymerization of the acrylate functionality during preparation, thus the arcylate functionality must be introduced onto the polyphosphazene using the substitution process employing a tertiary amine.

Alternatively, a mixture of the hydroxyalkyl acrylate and additional reactive compound in a predetermined molar ratio can be simultaneously reacted with the poly(dichlorophosphazene) to form copolymers. A further alternative is the stepwise addition of predetermined molar amounts of hydroxyalkyl acrylate and additional reactive compound in any order to the poly(dichlorophosphazene) using tertiary amine, as described above, in each step, to form copolymers.

The acrylate functionality containing polyphosphazene polymers of this invention are used to crosslink polymers containing ethylenic unsaturation such as those which are formed from alpha, beta-ethylenically unsaturated monomers, i.e., vinyl monomers, where the unsaturated groups are reactive with the acrylate functionality of the polyphosphazene polymers. Examples of the polymers which can be crosslinked using the polymers of the invention include vinyl interpolymers, acrylic interpolymers, styrene interpolymers and polyesters containing ethylenic unsaturation, as well as polyene interpolymers such as EPDM rubbers and butyl rubbers as well as their halogenated derivatives.

In addition, a mixture of the acrylate functionality containing polyphosphazene polymers and an ethylenically unsaturated monomer such as vinyl chloride, styrene, vinylidene chloride, $C_1$–$C_{12}$ alkylacrylates, and acrylonitrile can be used to form a crosslinked polymer system.

Further, polymers in admixture with reactive monomers can be crosslinked with the acrylate functionality containing polyphosphazene polymers. Examples include typical unsaturated polyesters with one or more reactive monomers such as alpha-olefins such as ethylene, propylene and butylene; vinyl esters of carboxylic acids such as vinyl acetate, vinyl butyrate, and vinyl stearate, the $C_{1-20}$ alkyl esters of acrylic and methacrylic acid such as methyl methacrylate, methylacrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$-$C_{20}$ mono- and dialkyl esters such as fumeric acid, maleic acid, itaconic acid, maleic anhydride, dibutyl fumarate and monoethyl maleate, amides of ethylenically unsaturated carboxylic acids such as acrylamide and methacrylamide, vinyl aryl compounds such as styrene and alphamethyl styrene; nitriles of ethylenically unsaturated carboxylic acids such as acrylonitrile and methacrylonitrile $C_1$-$C_{20}$ alkyl vinyl esters such as methyl vinyl ether, ethyl vinyl ether and stearyl vinyl ether; and dienes such as isoprene and butadiene.

The following examples are submitted for the purpose of further illustrating the nature of the present invention and are not intended as a limitation on the scope thereof. Parts and percentages referred to in the example are by weight unless otherwise indicated.

EXAMPLE 1

Preparation of
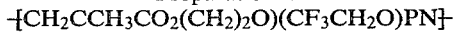

A bottle was charged with 5.37 cc (44 millimoles) of 2-hydroxyethyl-methacrylate, 100 cc of dry tetrahydrofuran (hereinafter THF), 12.3 cc (88 millimoles) of dry triethylamine, 3.2 cc (44 millimoles) of dry trifluoroethanol, and 30.5 gms (40.3 millimoles) of a THF solution containing 15.3 percent solids of poly(dichlorophosphazene). The bottle was heated at 120° C. for a period of 20 hours before a supernatant clear solution was removed from the needles of triethylamine hydrochloride. No P-Cl bonds were detected by infrared spectroscopy, indicating a high degree of substitution.

10 cc of clear solution was admixed with one cc of 0.06 M. benzoyl peroxide solution followed by vacuum stripping of the solvents. The resultant material was cured at 112° C. to 120° C. for 45 minutes in a mold to yield a highly THF insoluble thermoset, molded polymer having the following elemental analysis:

|  | C | H | N | P | Cl |
|---|---|---|---|---|---|
| Actual(%) | 32.73 | 5.08 | 8.13 | 14.84 | 1.99 |
| Calculated(%)* | 32.73 | 5.06 | 7.67 | 15.05 | 2.18 |

*Based on 8.45% TEA . HCl, 21.72% hydrolyzed chloropolymer, 5.36% trifluoroethoxide derivative and 57.30% methacrylate derivative of polyphosphazene.

The addition of 87 millimoles of styrene or maleic anhydride to a portion of the above vacuum stripped mixture before curing, yielded a highly THF insoluble, thermoset product was produced after curing.

EXAMPLE 2

Preparation of
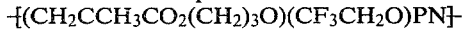

The following materials were added to a bottle and reacted in the same manner as the materials in Example 1: 6.19 cc (44 millimoles) of 3-hydroxypropylmethacrylate, 100 cc of dry THF, 12.3 cc (88 millimoles) of dry triethylamine, 3.2 cc (44 millimeters) of dry trifluoroethanol, 30.3 gms (40.0 millimoles) of a THF solution containing 15.3 percent solids of poly(dichlorophosphazene).

The resultant solution was separated from the needles of triethylamine hydrochloride. No P-Cl bonds were detected when the solution was subjected to an infrared spectroscopy measurement indicating a high degree of substitution.

10 cc of the resultant solution was admixed with 1 cc of 0.06 M. benzoyl peroxide followed by vacuum stripping of the solvents. The resultant material was cured at 112° C. to 120° C. for a period of 45 minutes to yield a THF insoluble thermoset, molded product having the following elemental analysis:

|  | C | H | N | P | Cl |
|---|---|---|---|---|---|
| Actual(%) | 28.01 | 4.61 | 8.39 | 14.31 | 2.00 |
| Calculated(%)* | 28.02 | 4.58 | 7.56 | 14.69 | 2.33 |

*Based on 9.06% TEA . HCl, 23.11% hydrolyzed chloropolymer, 14.74% trifluoroethoxy derivative and 40.11% methacrylate derivative of polyphosphazene.

The addition of 87 millimoles of styrene or maleic anhydride to a portion of the above vacuum stripped mixture, before curing, yielded a highly THF insoluble thermoset product was produced after curing.

We claim:

1. A polyphosphazene polymer comprised of units represented by the formulas:

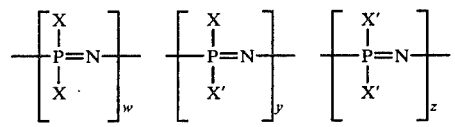

wherein X is

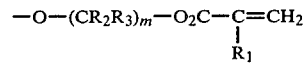

in which $R_1$ is selected from a group consisting of hydrogen and —$CH_3$; and $R_2$ and $R_3$ are independently selected for each carbon atom from a group consisting of hydrogen and alkyl radicals containing from 1 to 6 carbon atoms; and wherein X is independently selected for each polymer unit, X' is the same as X or is selected from a group consisting of substituted and unsubstituted alkoxy, aryloxy, amino and mercapto radicals, or mixtures thereof; $2 \leq m \leq 20$, and $w+y+z \geq 20$.

2. The polymer of claim 17 in which X and X' are —O—$(CR_2R_3)_m$—$O_2C$—$CR_1$=$CH_2$ wherein $R_1$ is selected from the group consisting of hydrogen and —$CH_3$; $R_2$ and $R_3$ are independently selected for each carbon atom from a group consisting of hydrogen and alkyl radicals containing from 1 to 6 carbon atoms.

3. The polymer in claim 2 in which X and X' are

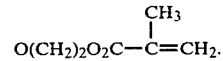

4. The polymer in claim 2 in which X and X' are

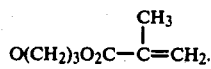

5. The polymer of claim 17 wherein X is —O—$(CR_2R_3)_m$—$O_2C$—$CR_1$=$CH_2$ in which $R_1$ is selected from a group consisting of hydrogen and —$CH_3$; and $R_2$ and $R_3$ are independently selected for each carbon atom from the group consisting of hydrogen and alkyl radicals containing from 1 to 6 carbon atoms, wherein X' is selected from the group consisting of substituted and unsubstituted alkoxy, aryloxy, amino and mercapto radicals, or mixtures thereof, and wherein the units of the polyphosphazene polymer are randomly distributed.

6. The poly of claim 5 wherein X is —$O(CH_2)_2$—$O_2CCCH_3CH_2$ and X' is —$OCH_2CF_3$.

7. The polymer of claim 5 wherein X is —$O(CH_2)_3$—$O_2CCCH_3CH_2$ and X' is —$OCH_2CF_3$.

8. The polymer of claim 5 wherein X is —$O(CH_2)_2$—$OCCCH_3CH_2$ and X' is a mixture of —$OC_6H_4Cl$ and —$OC_6H_4C_4H_9$.

9. A method of preparing polyphosphazene polymers comprised of units represented by the formulas:

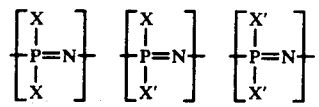

wherein X is

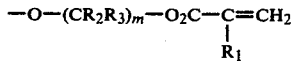

in which $R_1$ is selected from a group consisting of hydrogen and —$CH_3$; and $R_2$ and $R_3$ are independently selected for each carbon atom from a group consisting of hydrogen and alkyl radicals containing from 1 to 6 carbon atoms; and wherein X' is the same as X or is selected from a group consisting of substituted and unsubstituted alkoxy, aryloxy, amino and mercapto radicals, or mixtures thereof; and $2 \leq m \leq 20$; said method comprising reacting a poly(dichlorophosphazene) polymer having a formula —$(NPCl_2)_n$— where n is from 20 to 50,000 with a hydroxy containing alkyl acrylate ester or a mixture consisting of a hydroxy containing alkyl acrylate ester and a compound selected from a group consisting of a substituted and unsubstituted alkanol, aryl alcohol, amines and mercaptans or mixtures thereof, in the presence of a tertiary amine.

10. The method of claim 9 wherein the hydroxy containing alkyl acrylate ester is 2-hydroxyethylmethacrylate.

11. The method of claim 9 wherein the hydroxy containing alkyl acrylate ester is 3-hydroxypropylmethacrylate.

12. The method of claim 9 wherein the mixture consists of 2-hydroxyethyl-methacrylate and trifluoroethanol.

13. The method of claim 9 wherein the mixture consists of 3-hydroxypropyl-methacrylate and trifluoroethanol.

14. The method of claim 9 wherein the mixture consists of 2-hydroxyethyl-methacrylate, chlorophenol and tert-butyl phenol.

15. The method of claim 9 wherein the mixture consists of 3-hydroxypropyl-methacrylate, chlorophenol and tert-butyl phenol.

16. The method of claim 9 wherein the tertiary amine is triethylamine.

* * * * *